United States Patent
Wolfgang et al.

(10) Patent No.: US 8,068,964 B2
(45) Date of Patent: Nov. 29, 2011

(54) METHOD FOR DETERMINING THE DRIVING RESISTANCE OF A MOTOR VEHICLE

(75) Inventors: Werner Wolfgang, Ravensburg (DE);
Maik Würthner, Friedrichshafen (DE);
Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 516 days.

(21) Appl. No.: 12/299,818

(22) PCT Filed: Apr. 25, 2007

(86) PCT No.: PCT/EP2007/054014
§ 371 (c)(1),
(2), (4) Date: Nov. 6, 2008

(87) PCT Pub. No.: WO2007/131861
PCT Pub. Date: Nov. 22, 2007

(65) Prior Publication Data
US 2009/0198404 A1    Aug. 6, 2009

(30) Foreign Application Priority Data
May 12, 2006 (DE) .......................... 10 2006 022 170

(51) Int. Cl.
*F16H 61/02* (2006.01)
(52) U.S. Cl. ................. 701/55; 701/51; 701/58
(58) Field of Classification Search ............ 701/51, 701/55, 56, 58, 65, 66
See application file for complete search history.

(56) References Cited

U.S. PATENT DOCUMENTS

| | | | |
|---|---|---|---|
| 4,941,365 A | 7/1990 | Reiner et al. | |
| 5,490,063 A | 2/1996 | Genise | |
| 5,610,372 A * | 3/1997 | Phillips et al. | 177/25.14 |
| 6,314,383 B1 * | 11/2001 | Leimbach et al. | 702/173 |
| 6,633,006 B1 * | 10/2003 | Wolf et al. | 177/25.13 |
| 2003/0105574 A1 * | 6/2003 | Ino et al. | 701/93 |
| 2007/0078580 A1 * | 4/2007 | Cawthorne et al. | 701/51 |
| 2007/0118266 A1 * | 5/2007 | Hino et al. | 701/51 |
| 2008/0097674 A1 * | 4/2008 | Kuwahara et al. | 701/51 |
| 2008/0139362 A1 * | 6/2008 | Fujii et al. | 477/109 |

FOREIGN PATENT DOCUMENTS

| | | |
|---|---|---|
| DE | 33 14 800 A1 | 10/1984 |
| DE | 38 43 818 C1 | 5/1990 |
| DE | 43 26 182 A1 | 2/1994 |
| DE | 42 28 413 A1 | 3/1994 |
| DE | 196 00 914 A1 | 7/1997 |
| DE | 695 05 282 T2 | 6/1999 |
| DE | 198 37 380 A1 | 2/2000 |
| DE | 199 31 785 A1 | 1/2001 |
| DE | 101 06 935 A1 | 8/2002 |
| EP | 1 067 317 A2 | 1/2001 |

* cited by examiner

*Primary Examiner* — Ruth Ilan
(74) *Attorney, Agent, or Firm* — Davis & Bujold, P.L.L.C.

(57) ABSTRACT

A method for determining the driving resistance of a motor vehicle simultaneously with a shift of an automated shift transmission from a load gear to a target gear such that if a difference between a first driving resistance value $F\_fw\_1$ and a second driving resistance value $F\_fw\_2$ is large, the shift operation can be corrected. The second driving resistance value $F\_fw\_2$ is determined during the shift operation. a time interval $\Delta t$ which contains the traction-force-free phase of the shift, a plurality of acceleration values $a\_i$ of the motor vehicle are measured to obtain the minimum acceleration $a\_min$ if the shift operation is a traction shift or the maximum acceleration $a\_max$ if it is thrust shift. With the mass m of the vehicle, the second driving resistance value $F\_fw\_2$ is calculated with one of the formula $F\_fw\_2 = -m*a\_min$ or $F\_fw\_2 = -m*a\_max$.

11 Claims, 2 Drawing Sheets

METHOD FOR DETERMINING THE DRIVING RESISTANCE OF A MOTOR VEHICLE

This application is a national stage completion of PCT/EP2007/054014 filed Apr. 25, 2007, which claims priority from German Application Serial No. 10 2006 022 170.2 filed May 12, 2006.

FIELD OF THE INVENTION

The invention concerns a method for determining the driving resistance of a motor vehicle, which is implemented in conjunction with a shift of an automated shift transmission from a load gear to a target gear, such that a first driving resistance value $F\_fw\_1$ is determined before the shift operation begins and a second driving resistance value $F\_fw\_2$ is determined at a later point in time, so that, if the change of the driving resistance $\Delta F\_fw = F\_fw\_2 - F\_fw\_1$ is large, the shift operation can be corrected.

BACKGROUND OF THE INVENTION

Knowledge of the driving resistance of a motor vehicle is of fundamental importance in enabling optimum control of the shifting behavior of an automated shift transmission, i.e., control which is adapted to the driving situation at the time. This is because the determination of the shift speed at which the currently engaged gear should be disengaged by a shift operation and that of the target gear into which the shift should be made are essentially influenced by the current driving resistance of the motor vehicle.

As is known, the driving resistance $F\_fw$ of a vehicle is the sum of the road inclination resistance $F\_steig$, the rolling resistance $F\_roll$ and the air resistance $F\_luft$, i.e., $F\_fw = F\_steig + F\_roll + F\_luft$. In accordance with the generally known driving resistance equation:

$$F\_zug = F\_steig + F\_roll + F\_luft + F\_träg = F\_fw + F\_träg$$

the driving resistance is related to the traction force $F\_zug$ of the drive engine acting on the drive wheels of the motor vehicle and the mass moment of inertia $F\_träg$ of the motor vehicle, the latter being the product of the current vehicle mass m and the current acceleration a of the vehicle in accordance with the equation $F\_träg = m*a$. The driving resistance can therefore be written as:

$$F\_fw = F\_zug - m*a$$

Whereas the determination of driving resistance $F\_fw$ before and after a shift, i.e., with a gear engaged and the engine clutch engaged, presents no problem and can be done in the known way by calculating the traction force $F\_zug$ from the torque of the drive engine and the transmission ratio of the gear engaged and by calculating the mass moment of inertia $F\_träg$ from the current mass m and the current acceleration a of the motor vehicle, to determine the driving resistance $F\_fw$ during a shift operation is difficult since, during this phase, forces and torques which are largely unknown and difficult to measure act upon the output side of the drive train.

Thus it is largely unknown how quickly the torque of the drive engine falls and increases again during a shift operation; what fraction of the torque is lost due to synchronization of the target gear, and what effect speed fluctuations that can be caused by the shifting process, such as by disengaging and engaging the engine clutch, disengaging the load gear and synchronizing and engaging the target gear or, due to unevenness of the road, have on the driving dynamics of the motor vehicle, i.e., on its actual acceleration. Because of these problems, previous methods for controlling a transmission shift have not included any attempt to determine the driving resistance during a shift operation.

If the driving resistance remains largely constant before, during and after a shift, this is completely unproblematic, since the intended gear selected by the shift program on the assumption of an approximately constant driving resistance $F\_fw$ is generally optimally adapted to the driving situation at the time.

But if the driving resistance $F\_fw$ changes markedly during a shift, this can lead to problems, because the shift program of the transmission control unit begins from an erroneous driving resistance $F\_fw$ and the changed, correct driving resistance $F\_fw$ can only be determined after a time delay following the completion of the shift operation.

For example, if the motor vehicle drives from level ground onto a steeply rising stretch during an upshift, then owing to the increased driving resistance $F\_fw$, a downshift to a lower gear should take place immediately on completion of the upshift. But if this downshift takes place too late, because of a delay in determining the new, higher driving resistance $F\_fw$, in some circumstances the motor vehicle may come to rest if the drive engine torque, modified because of the gear engaged at the time, is no longer large enough to produce a sufficiently high traction force $F\_zug$.

This problematic situation can be avoided, apart from by an immediate downshift, also by changing the target gear during the upshift to a lower gear, such as a gear, between the load gear and the target gear (upshift to a lower gear), by remaining in the original load gear (target gear=load gear, no transmission ratio change) or by shifting to a gear lower than the load gear (the upshift becomes a downshift). Such reactions, however, require early knowledge of the changed—in the above example, increased—driving resistance $F\_fw$.

Accordingly, the purpose of the present invention is to indicate a method for determining the driving resistance $F\_fw$, such that a change of the driving resistance $F\_fw$, during a shift operation, can be determined at an early stage so that if a correction of the shift is required, it can be carried out at the right time.

SUMMARY OF THE INVENTION

This objective is achieved by a method of determining the driving resistance of a motor vehicle, which is implemented in conjunction with a shift of an automated shift transmission from a load gear to a target gear, such that a first driving resistance value $F\_fw\_1$ is determined before the beginning of a shift operation and a second driving resistance $F\_fw\_2$ is determined at a later point in time so that, if the change of the driving resistance $F\_fw = F\_fw\_2 - F\_fw\_1$ is large, the shift operation can be corrected.

In this case, provision is made for the second driving resistance value $F\_fw\_2$ to be determined during the shift operation in that, during a time interval $\Delta t$ which contains the traction-force-free phase of the shift operation, a number of discrete values $a\_i$ of the current acceleration a of the motor vehicle are determined, from these acceleration values $a\_i$ the minimum acceleration $a\_min$ is determined during a traction shift and the maximum acceleration $a\_max$ is determined during a thrust shift, and from the respective extreme acceleration value ($a\_min$ or $a\_max$) and the mass m of the vehicle, the second driving resistance value (driving resistance during the shift operation) $F\_fw\_2$ is calculated from the formula:

$$F\_fw\_2 = -m*a\_min \text{ or } F\_fw\_2 = -m*a\_max$$

Since the time interval Δt, during which the acceleration values a_i are determined, includes the traction-force-free phase of the shift, if the time resolution is sufficient then at least one of the acceleration values a_i will correspond to the vehicle acceleration a which results from the driving resistance F_fw alone since, because the drive train is disengaged, no traction force from the drive engine is acting (F_zug=0).

During a traction shift, this acceleration value a_i clearly corresponds to the minimum of the acceleration values a_i, i.e., to the minimum acceleration value a_min and during a thrust shift clearly to the maximum of the acceleration values a_i, i.e., to the maximum acceleration a_max. Thus, using the respective extreme value of the acceleration (a_min or a_max), the mass m of the vehicle and the formula:

$$F\_fw\_2 = -m * a\_min \text{ or } F\_fw\_2 = -m * a\_max$$

as the case may be, a relatively accurate value of the driving resistance F_fw can be calculated during the shift operation, which is to be associated in time approximately with the middle of the shift operation. Accordingly, a change of the driving resistance ΔF_fw=F_fw_2−F_fw_1 is recognized at an early stage so that, if this driving resistance ΔF_fw is large, the current shift operation can be corrected well in time.

The acceleration a of the motor vehicle determined as an extreme value (a_min or a_max) during the shift, i.e., in the traction-force-free phase of the shift operation, can also be used to determine the mass m of the vehicle. However, since this would relate to a different method, in the present case, the mass m of the vehicle is taken to be a known quantity.

In the method according to the present invention, if a large change of the driving resistance ΔF_fw is found during or immediately after a shift, the reaction to this, in the sense of a correction of the current shift operation, can take place as follows:

1. Driving Situation:
   Traction upshift on driving from flat ground onto an uphill stretch;
   an immediate downshift after the upshift (rapid follow-up shift)
   during the shift, correction of the target gear to the previously engaged load gear (no transmission ratio change);
   during the shift, correction of the target gear to a lower gear (the upshift becomes a downshift).
2. Driving Situation:
   Traction downshift on driving from an uphill stretch onto flat ground:
   immediate upshift after the downshift (rapid follow-up shift);
   during the shift, correction of the target gear to the previously engaged load gear (no transmission ratio change);
   during the shift, correction of the target gear to a higher gear (the downshift becomes up upshift).
3. Driving Situation:
   Thrust downshift when driving from a downhill stretch onto flat ground:
   during the shift, correction of the target gear to the previously engaged load gear (no transmission ratio change);

To determine an optimum extreme value of the acceleration (a_min or a_max), provision is made for determining the respective acceleration values a_i preferably at time intervals of at most 10 ms. Experience has shown that doing this ensures that at least one of the acceleration values a_i corresponds to the extreme value (a_min or a_max) influenced exclusively by the driving resistance F_fw.

To eliminate measurement errors and interferences during the determination of the acceleration values a_i, these are expediently filtered before the extreme acceleration value (a_min or a_max) is determined and, for that purpose, generally known numerical methods can be used.

The time interval Δt for determining the acceleration values a_i can start when disengaging the engine clutch begins and end when engaging the engine clutch is completed. In that case, it is true that the first and last acceleration values a_i are very erroneous, because the engine clutch is not yet completely disengaged or only partly engaged again so that some traction or thrust force from the drive engine is still acting. However, these acceleration values a_i are certainly ignored when determining the extreme value (a_min or a_max) and, therefore, have no adverse effect on the determination of acceleration during the shift operation, i.e., during the rolling phase of the shift. On the other hand, the time interval Δt for determining the acceleration values a_i can be made shorter, beginning when the disengagement of the load gear starts and ending when the engagement of the target gear is completed.

Preferably, the method is only used when a clear minimum acceleration a_min or maximum acceleration a_max occurs during the shift process. This is only the case, however, during a pure traction shift (traction operation before and after the shift) or a pure thrust shift (thrust operation before and after the shift).

It is, therefore, expedient, before determining the driving resistance F_fw_2 during the shift or determining the extreme value (a_min or a_max) from the acceleration values a_i, first to check whether the current shift operation is a pure traction shift or a pure thrust shift so that the second driving resistance value (driving resistance during the shift) F_fw_2 is only determined when the shift operation is a pure traction shift or a pure thrust shift.

To determine the type of the shift, preferably the torque of the drive engine is determined before the beginning of the shift and after the end thereof, M_vS, M_nS respectively, and a pure traction shift has taken place when both of the torque values M_vS, M_nS are greater than zero (M_vS>0 and M_nS>0), whereas a pure thrust shift has taken place when both torque values M_vS, M_nS are less than zero (both M_vS<0 and M_nS<0).

The torque of the drive engine M_vS before the shift is involved in the determination of the first drive resistance value F_fw_1, but the determination of this torque when the torque M_vS has a small absolute value is relatively inaccurate. In addition, when the torque of the drive engine M_vS before the shift has a small absolute value, the acceleration difference between traction and thrust operation before the shift and the rolling in the traction-force-free phase during the shift is relatively small so that, in this case, interferences and measurement errors can have a disproportionately large effect. Consequently, the determination of the driving resistance change ΔF_fw=F_fw_2−F_fw_1 would then also be comparatively inaccurate and, in some circumstances, this could result in a wrong reaction of the transmission control system.

To avoid an erroneous determination of the driving resistance F_fw, it is therefore expediently provided that the drive engine torque before the start of the shift M_vS is determined first and, in the event of a pure traction shift, compared with a predetermined minimum torque M_Zmin and further, that the second driving resistance value (driving resistance during the shift operation) F_fw_2 is only determined if the drive engine torque is larger than or equal to the minimum torque (M_vS>=M_Zmin).

Analogously, in the event of a pure thrust shift, the drive engine torque, before the start of the shift M_vS, is compared with a predetermined maximum torque M_Smax and the second driving resistance value (driving resistance during the shift operation) F_fw_2 is only determined if the drive engine torque is smaller than or equal to the maximum torque (M_vS<=M_Smax).

Likewise, the actuation of decelerating devices, such as the working brakes, the parking brake or a retarder during the shift operation would lead to the determination of an erroneous extreme acceleration value (a_min or a_max) and thus also of an erroneous second driving resistance value F_fw_2, since the motor vehicle would then not be rolling freely during the traction-force-free phase. For example the working brakes, i.e., the wheel brakes, might be actuated either by the driver using the brake pedal or automatically by a control system such as ESP or ABS. To avoid an erroneous determination of the driving resistance F_fw caused by this, during the shift operation, it is expedient to detect the actuation status of the motor vehicle's decelerating devices and, if at least one of the decelerating devices is active, to discontinue the determination of the second driving resistance value (driving resistance during the shift operation) F_fw_2.

BRIEF DESCRIPTION OF THE DRAWINGS

The invention will now be described, by way of example, with reference to the accompanying drawings in which.

DETAILED DESCRIPTION OF THE INVENTION

Figure 1:
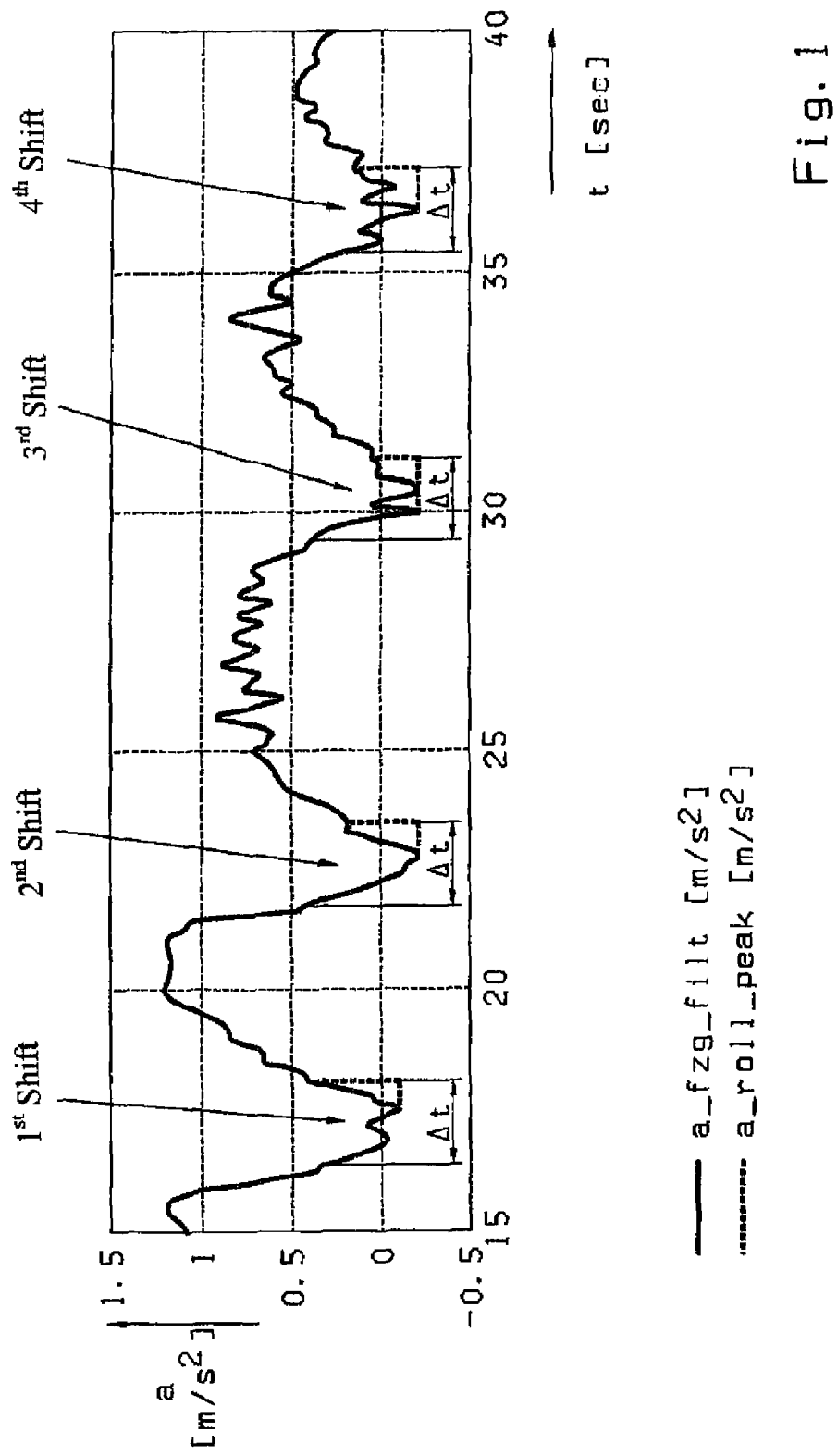
FIG. 1 is a measured time variation of the vehicle's acceleration a over several traction shifts.

In the method, the determination of a change of the driving resistance F_fw during a gearshift operation relies on exact determination of a motor vehicle's acceleration a during the traction-force-free, rolling phase of the shift. An example of how this acceleration value is determined is illustrated in FIG. 1, which shows the time variation of the acceleration a of a motor vehicle over several shift operations, each involving an interruption of the traction force. In the Figure, the continuous line is a continuous representation of a filtered values a_fzg_filt, i.e., acceleration values a_i determined during a defined time interval of around 10 to 20 ms. Each of the shifts is a traction shift.

Consequently, each of the shifts results in a fall of the acceleration a, which assumes negative values<0 m/s² during the shift operations in each case. Thus, during each shift operation, the motor vehicle is slowed down by the effective driving resistance F_fw, since the drive train is temporarily disengaged and no drive torque in the form of a traction force can then be transferred to the drive wheels (F_zu=0).

To determine the acceleration a in the traction-force-free phase of the shift operation, at each of the shifts during a time interval Δt which includes the traction-force-free phase, an extreme value of the acceleration values a_i measured during the time interval is determined. In this example, since the shifts are traction shifts, an acceleration minimum a_min is determined in each case.

The variation of this extreme value a_roll_peak is represented in FIG. 1 in each case by a broken line. From this, it is clear that by way of the method, the respective minimum acceleration a_min is determined reliably despite the existence of marked interferences at the beginning and end of each shift. In each case, it is clear that the momentary driving resistance F_fw_2 is associated with the respective minimum acceleration a_min so that a relatively accurate calculation of the driving resistance F_fw_2 during the shift operation is made possible thereby.

In the zones of a time variation t within which the variation of a_roll_peak does not differ from a_fzg_filt, in particular outside the intervals Δt, the two variations a_roll_peak and a_fzg_filt are superimposed.

Figure 2:
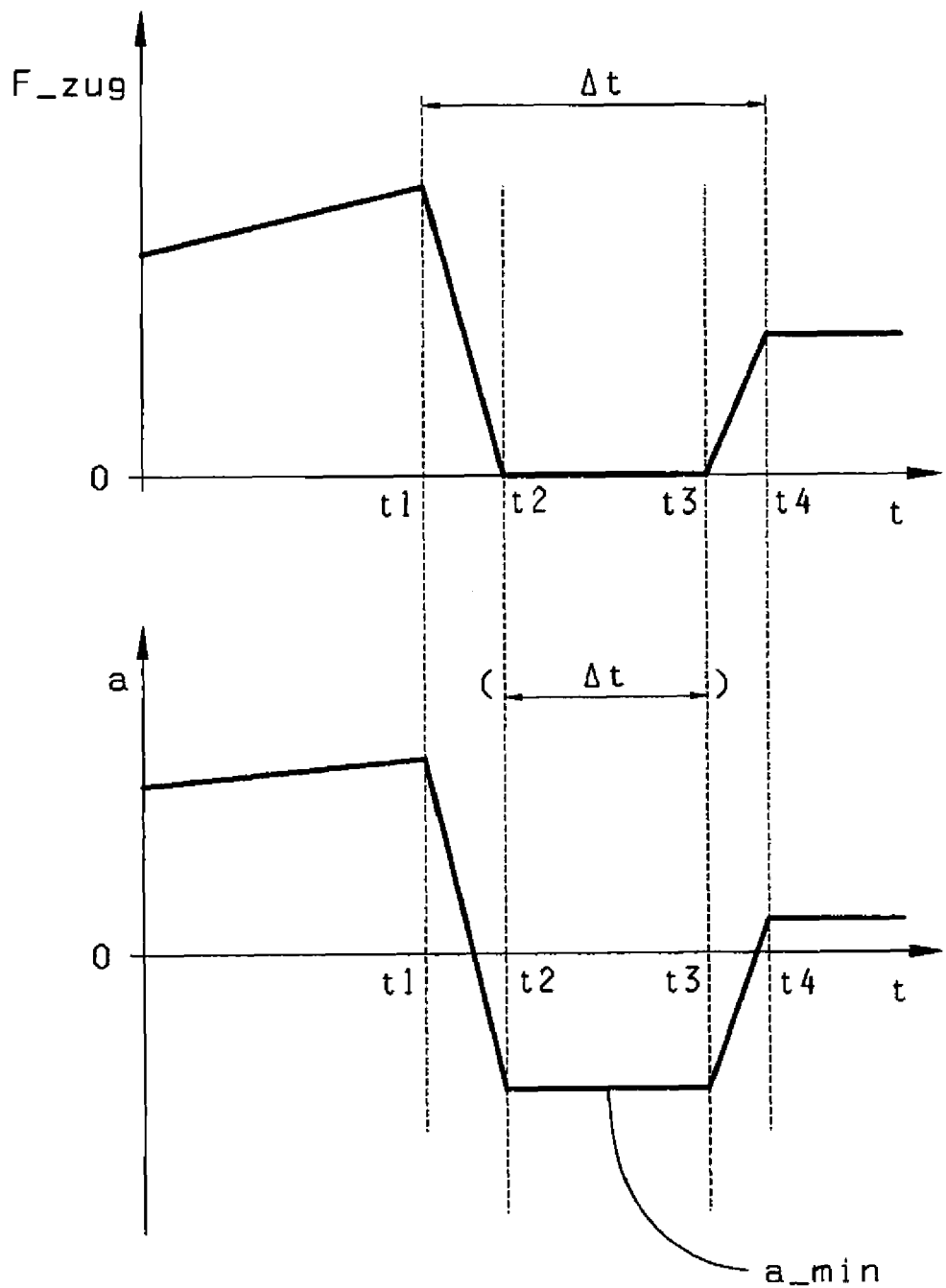
FIG. 2 is a simplified time variation of the traction force F_zug and the acceleration a during a single traction upshift.

For further clarification of the method, FIG. 2 shows a traction upshift with simplified time variations of the acceleration a and a drive engine traction force F_zug applied to the drive wheels, represented with higher time resolution. The shift operation begins at time t1 and ends at time t4. Between times t1 and t2, the engine clutch is disengaged and torque from the drive engine falls; sometimes also, the engaged load gear is disengaged. Immediately before time t3, the target gear to be engaged is synchronized and then engaged. The engine clutch is engaged and torque from the drive engine builds up between times t3 and t4.

Thus, the traction-force-free phase of the shift operation extends approximately between times t2 and t3 although, as is known, marked interfering influences can act at the beginning and end of that period. However, in the middle of the traction-force-free phase, the acceleration a is substantially free from interference and corresponds to the minimum value a_min sought.

For a reliable determination of the minimum acceleration a_min, the time interval Δt, during which the minimum acceleration a_min is determined from the on-going acceleration values a_i or a_fzg_filt, is chosen such that it is sure to contain the traction-force-free phase. For example, as indicated in the upper part of FIG. 2, the time interval Δt can extend from time t1 to time t4 or, as in the lower part of FIG. 2, from time t2 to time t3.

REFERENCE NUMERALS a acceleration, longitudinal acceleration
a_fzg_filt filtered acceleration value
a_i discrete acceleration value
a_max maximum value of a_i, maximum acceleration
a_min minimum value of a_i, minimum acceleration
a_roll_peak extreme value of the acceleration
F_fw driving resistance
F_fw_1 first driving resistance value, F_fw before a shift
F_fw_2 second driving resistance value, F_fw during a shift
F_luft air resistance
F_roll rolling resistance
F_steig resistance due to road inclination
F_träg mass moment of inertia
F_zug traction force
ΔF_fw change of the driving resistance
m mass, overall mass
M torque
M_nS torque after a shift
M_Smax maximum torque for a thrust shift
M_vS torque before a shift
M_Zmin minimum torque for a traction shift
t time
t1 time point
t2 time point
t3 time point
t4 time point
Δt time interval

The invention claimed is:

1. A method for determining driving resistance of a motor vehicle during a shift operation of an automated shift transmission from a load gear to a target gear to alter the shift operation depending on the determined driving resistance and a type of the shift operation implemented, the method comprising the steps of:

determining a first driving resistance value (F_fw_1) before the shift operation begins
initiating either a traction type of shift operation or a thrust type of shift operation;
measuring, over a time interval (Δt) which contains a traction-force-free phase of the shift operation, a plurality of discrete acceleration values (a_i) of current acceleration (a) of the motor vehicle,
determining from the plurality of discrete acceleration values (a_i) either a minimum acceleration value (a_min), if the traction type of shift operation is initiated, or a maximum acceleration value (a_max), if the thrust type of shift operation is initiated; and;
calculating a second driving resistance value (F_fw_2) during the shift operation using a mass (m) of the vehicle and either a first formula, if the traction type of shift operation is initiated, or a second formula, if the thrust type of shift operation is initiated,
the first formula being: F_fw_2=−m*a_min, and
the second formula being: F_fw_2=−m*a_max; and
adjusting the shift operation based on a difference between the first driving resistance value and the second driving resistance value (ΔF_fw=F_fw_2−F_fw_1).

2. The method according to claim 1, further comprising the step of measuring the discrete acceleration values (a_i), at time intervals of at most 10 ms, for determining either the minimum acceleration value (a_min) or the maximum acceleration value (a_max).

3. The method according to claim 1, further comprising the step of filtering the plurality of discrete acceleration values (a_i) before determining the minimum acceleration value (a_min) or the maximum acceleration value (a_max) to eliminate measurement errors and interferences.

4. The method according to claim 1, further comprising the step of beginning the time interval (Δt) for measuring the plurality of discrete acceleration values (a_i) when disengagement of an engine clutch starts (t1) and ending the time interval (Δt) when engagement of the engine clutch is complete (t4).

5. The method according to claim 1, further comprising the step of beginning the time interval (Δt) for measuring the plurality of discrete acceleration values (a_i) when disengagement of a load gear starts (t2) and ending the time interval (Δt) when engagement of a target gear is completed (t3).

6. The method according to claim 1, further comprising the step of determining whether the shift operation is either a pure traction type of shift operation or a pure thrust type of shift operation and determining the second driving resistance value (F_fw_2) only if the type of shift operation is one of the pure traction type of shift operation or the pure thrust type of shift operation.

7. The method according to claim 6, further comprising the step of determining whether the shift operation is either the pure traction type of shift operation or the pure thrust type of shift operation by determining a first drive engine torque value (M_vS) before initiating the shift operation and a second drive engine torque value (M_nS) after completing the shift operation, and concluding that the shift operation is the pure traction type of shift operation, if both the first and the second drive engine torque values (M_vS, M_nS) are greater than zero (both M_vS>0 and M_nS>0), and concluding that the shift operation is the pure thrust type of shift operation, if both the first and the second drive engine torque values (M_vS, M_nS) are less than zero (both M_nS<0 and M_nS<0).

8. The method according to claim 6, further comprising the step of determining a first drive engine torque value (M_vS) before beginning the shift operation and comparing the first drive engine torque value (M_vS) with a predetermined minimum torque (M_Zmin), if the shift operation is the pure traction type of shift operation, and determining the pure driving resistance value (F_fw_2) only if the first drive engine torque value is greater than or equal to the predetermined minimum torque (M_vS>=M_Zmin).

9. The method according to claim 6, further comprising the step of determining a first drive engine torque value (M_vS) before beginning the shift operation, and comparing the first drive engine torque value (M_vS) with a predetermined maximum torque (M_Smax) if the shift operation is the pure thrust type of shift operation, and determining a second driving resistance value (F_fw_2) only if the first drive engine torque value is less than or equal to the predetermined maximum torque (M_vS<=M_Smax).

10. The method according to claim 1, further comprising the step of determining an actuation status of decelerating devices of the motor vehicle during the shift operation, and discontinuing determination of the second driving resistance value (F_fw_2) if at least one of the decelerating devices of the motor vehicle is active.

11. A method of determining driving resistance of a motor vehicle simultaneous to implementation of a shift operation of an automated shift transmission from a load gear to a target gear to alter the shift operation depending on the determined driving resistance and a defined type of the shift operation, the method comprising the steps of:
determining a first driving resistance value (F_fw_1) and a first drive engine torque value (M_vS) before the shift operation begins;
measuring a plurality of discreet current acceleration values (a_i) over a time interval (Δt) starting from an initial time point, the time interval (Δt) contains a traction-force-free phase of the shift operation;
determining a second drive engine torque value (M_nS);
defining the type of the shift operation as:
a pure traction shift if the first drive engine torque value (M_vS) and the second drive engine torque value (M_nS) are greater than zero (M_vS>0 and M_nS>0), or
a pure thrust shift if the first drive engine torque value (M_vS) and the second drive engine torque value (M_nS) are less than zero (M_vS<0 and M_nS<0);
terminating the method of determining the driving resistance of the motor vehicle and alteration of the shift operation, if the shift operation is neither of the pure traction shift type or the pure thrust shift type;
ascertaining a minimum acceleration value (a_min) from the plurality of discreet current acceleration values (a_i) if the shift operation is the pure traction shift type;
ascertaining a maximum acceleration value (a_max) from the plurality of discreet current acceleration values (a_i) if the shift operation is the pure thrust shift type;
determining the second driving resistance value (F_fw_2) during the shift operation using one of a first formula, if the shift operation is the pure traction shift type or a second formula if the shift operation is the pure thrust shift type, and a mass (m) of the motor vehicle
the first formula being: F_fw_2=−m*a_min, and
the second formula being: F_fw_2=−m*a_max; and
adjusting the shift operation based on a difference between the first driving resistance value (F_fw_1) and the second driving resistance value (F_fw_2).

* * * * *